United States Patent
Nunes et al.

[15] 3,704,877
[45] Dec. 5, 1972

[54] MEANS AND METHOD OF ENERGY STORAGE AND DAMPING

[72] Inventors: John Nunes, 239 Worthen Road, Lexington, Mass. 02173; Arthur L. Geary, 1035 Woodland, Barrington; John A. Roberts, 459 W. Oakwood Dr., Timberlake, Barrington, both of Ill. 60010

[22] Filed: Feb. 22, 1971

[21] Appl. No.: 117,316

[52] U.S. Cl. ............................................. 267/166
[51] Int. Cl. ............................................. F16f 1/06
[58] Field of Search ......................... 267/166, 180

[56] References Cited

UNITED STATES PATENTS 2,277,500    3/1942    Murray ............................. 267/180

Primary Examiner—James B. Marbert
Attorney—Donald S. Olexa, Jerome M. Teplitz, John G. Heimovics, William G. Lawler, Jr. and Hofgren, Wegner, Allen, Stellman & McCord

[57] ABSTRACT

A one-piece energy controlling device formed of a composite of at least two different materials, having desired energy storage and energy damping characteristics. The preferred devices have a plurality of unidirectional, elongated filaments of one material extending through and embedded in a matrix of a second dissimilar material to form an elongated structure which is set in a spring shape. The devices can be designed for use either as springs to store energy or for use as one-piece spring energy damper to both store energy and/or dissipate energy at different selected load levels.

20 Claims, 12 Drawing Figures

PATENTED DEC 5 1972 3,704,877
SHEET 1 OF 3
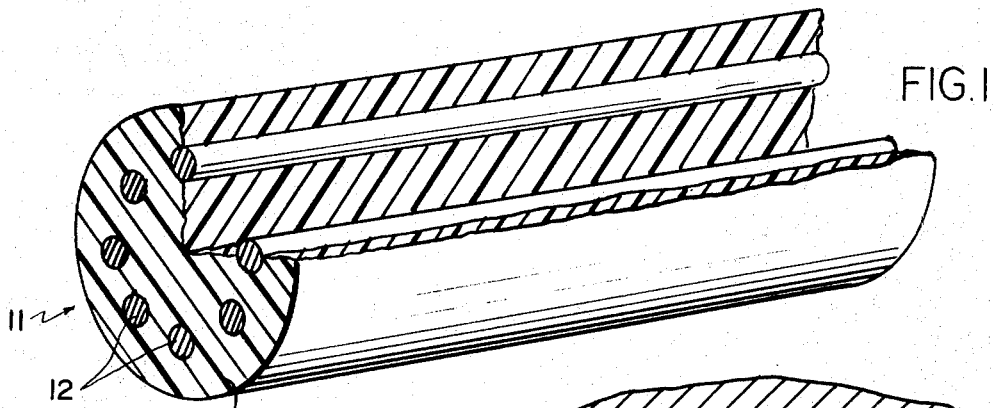
FIG.1
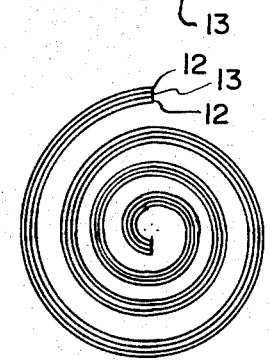
FIG.3
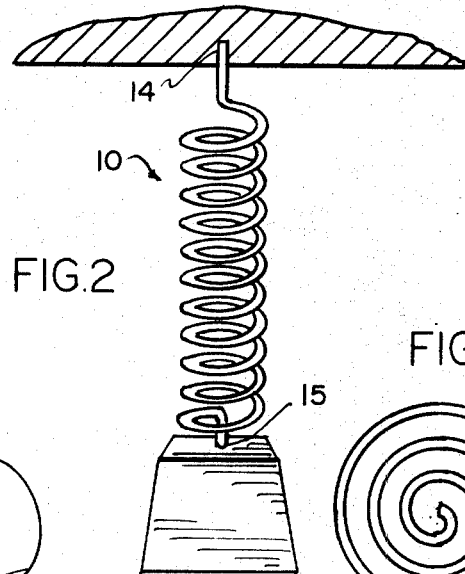
FIG.2
FIG.4
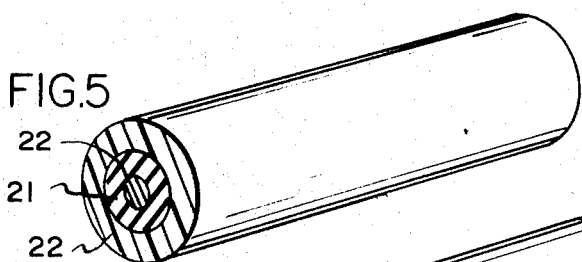
FIG.5
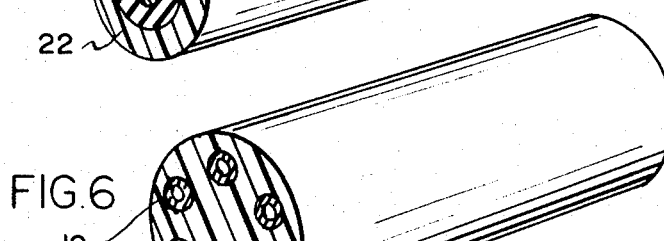
FIG.6
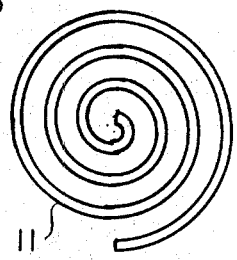
FIG.7
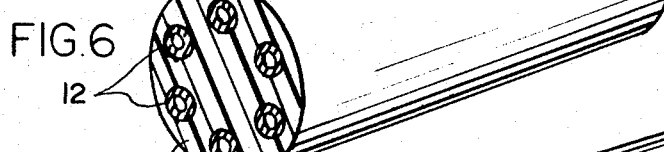
FIG.8
INVENTORS
ARTHUR L. GEARY
JOHN A. ROBERTS
JOHN NUNES
BY *[signature]*
ATTORNEY

MEANS AND METHOD OF ENERGY STORAGE AND DAMPING

BACKGROUND OF THE INVENTION

Energy storage and energy damping have often been considered as two separate fields in the prior art. Thus, it is common to use a variety of conventional springs to store energy and a variety of conventional shock absorbers to provide energy damping.

Conventional springs for energy storage are normally formed of common spring materials usually alloys of metals, with high tensile strength normally achieved at small diameter of the material. For example, conventional materials could only achieve high tensile strengths in the range of 500,000 p.s.i. at small diameters such as 5 mil or less, and 400,000 p.s.i. at small diameters such as 10 mil or less. Other specialized spring constructions known in the prior art include springs formed of bimetallic laminates, used when thermal expansion characteristics are important. However, such bimetallic springs have found limited use, with application only in specialized fields where high strength-low modulus springs are not required. Still other springs have been formed of plastic and glass for specialized purposes as where low weight and nonmagnetic properties are desired.

In all cases in the spring art, the materials are selected to maximize energy storage at particular load levels. However, prior art springs are limited in energy storage for a given material, spring size, and spring configuration.

The various forms of energy dampers and vibration isolators known in the art are used for their damping or energy absorbing properties. However, these materials and devices are highly temperature sensitive, with conventional materials used for vibration isolation and damping deteriorating at temperatures above 500° F. Conventional materials have only been developed to work at or below 500° F, with steel wool being an exception capable of operating above 500° F in frictional damping.

A further limitation on conventional devices used for absorbing energy, is the fact that they are dependent upon the rate of force of energy input. Therefore, these devices must be designed for a particular range of rate of input of forces, in order to function at all. By being independent of the rate of energy input, the energy dissipating properties of the present invention are only dependent upon the type of loading, which must be cyclic in order for energy dissipation to take place.

When both energy storage or spring properties as well as energy absorbing or damping properties are necessary, it is common to attach conventional springs to conventional dampers in various mechanical arrangements. For example, motor vehicles commonly utilize body suspensions having both springs and hydraulically operated shock absorbers in mechanical combinations to store and damp energy. Such multipart arrangements can be costly, heavy in weight, large in size and provide significant mechanical design complications.

Although some disclosure was made on fiber-reinforced metals in a research report by A. A. Baker and D. Cratchley, "Stress-Strain Behavior and Toughness of Fiber-Reinforced Metal," Applied Materials Research, 1966, no mention is made of the advantages obtainable with use of these fiber-reinforced metals at very high temperatures. Further, no recognition is made of the effect of diameter size of the reinforced metal to its tensile strength or of the fact that these fiber reinforced metals could function as an energy dissipator independent of the rate of input of the energy.

SUMMARY OF THE INVENTION

It is accordingly a general object of this invention to provide one-piece spring-energy dissipating shapes formed of unitary energy controlling composites having the combined functions of energy storage and energy damping.

Another object of this invention provides for energy storage shapes formed of unitary energy controlling composites of at least two dissimilar materials which shapes act as springs and energy dissipators which have high strength and low modulus, thereby eliminating the necessity of using separate spring and energy dampers heretobefore required in a variety of conventional application uses, including spring applications, vibration isolators and dampers.

Another object of this invention is to provide energy controlling shapes in accordance with any of the preceding objects in which energy storage and damping characteristics can be varied and predetermined within specified load ranges where maximum recoverable energy storage is achieved in one load range, and optimum damping is achieved in another load range.

A further object of this invention is to provide for an energy controlling composite that has its tensile strength independent of the diameter size of the composite, with tensile strengths of 400,000 and 500,000 p.s.i. and more in large diameter pieces, heretofore not possible with conventional spring alloys.

Another object of the present invention is the provision of an energy controlling composite, having energy storage and energy damping properties, that is capable of operating at very high temperatures at or above 500° F heretofore not possible with conventional materials.

A further object of this invention is to provide for an energy controlling device that has energy dissipating properties independent of the rate of input of energy, and accordingly can function over a continuous range of force inputs thereby eliminating the necessity of having to design for a particular range of force inputs as in conventional devices.

It is a feature of the unitary composite of the present invention that the energy controlling device or shape has an improved fatigue property as compared to similar devices and shapes made of conventional materials, is low in cost, lightweight, and highly compact. Since the energy controlling shapes can store and dissipate energy as a single unit, it eliminates the necessity for mechanical linkages thereby minimizing the overall size, weight, and cost of the device.

It is still another feature of this invention that the spring damper shapes of this invention act to translate mechanical energy into heat energy and are capable of dissipating the heat energy under predetermined mechanical loads. By varying the design characteristics of the spring-damper shapes, predetermined energy absorbing and/or energy damping can be obtained at predetermined load levels.

According to the invention, an energy storage and energy dissipating device in a spring shape is formed of an energy controlling composite of at least two dissimilar metals, plastics, ceramics, glass, rubber, or visco-elastic materials. In the preferred embodiment, the energy controlling composite is formed of at least two dissimilar metallic materials with a mechanical and/or metallurgical interfacial bond therebeteen. The bond prevents movement of either material with respect to the other when a load is applied, so that the two materials are subject to equal strain. One of the materials is in the form of a plurality of elongated elements embedded in a matrix of the other dissimilar material which individually separates the plurality of elongated elements.

Although the composite material is made of at least two dissimilar materials, it is preferrable, in order to optimize the energy dissipating property of the composite, that one of the materials have an elastic yield strain limit at least twice as high as the lowest measurable yield strain limit of the other material. The lowest measureable yield strain of the other material being defined as the lowest yield strain in tension or compression of the other material. For convenience, we define the lower yield limit as terminating the primary modulus region, and the higher yield strain as terminating the secondary modulus region.

With the composite having two modulus regions, its energy storage and damping properties are exhibited in a stress - strain hysteresis loop when subjected to strain at predetermined levels at or below the secondary material elastic yield train limit, but above the primary material elastic yield strain limit. The primary modulus region, an elastic region of the composite is where the composite materials function elastically, and strain loads in this region cause the materials to act as a spring to store energy. The secondary modulus, a pseudoelastic region of the composite is where plastic deformation of the material having the lower yield strain takes place, and cyclic loads into this region cause the energy controlling composite to absorb and dissipate energy in the form of heat developed during this plastic deformation. Accordingly, the lower yield strain material undergoes both elastic and plastic deformation whereas the higher yield strain material undergoes only elastic deformation in the secondary modulus region. In order for this energy controlling composite to exhibit energy storage and dissipating properties in the form of a stress - strain hysteresis loop, the cyclic loading must be of sufficient amplitude such that loading and unloading will result in a closed-loop hysteresis loop. The loading therefore must consist of a static load plus an oscillating or cyclic load around this static load, all this to be described in detail later.

According to the methods of this invention, a composite shape of this invention is positioned within the space separating two points between which mechanical damping and/or mechanical energy storage are desired.

The composite shapes of this invention can be easily formed by any of the conventional methods known in the art designed for these purposes.

BRIEF DESCRIPTION OF THE DRAWINGS

The above and other objects, advantages and features of the present invention will be better understood from the following specification when read in conjunction with the accompanying drawings in which:

FIG. 1 is a perspective cross sectional view along the axis of an elongated composite of the present invention, prior to mechanical setting in a desired shape;

FIG. 2 is a side view of a preferred embodiment of this invention showing the elongated composite of FIG. 1 set in a helical spring shape;

FIG. 3 is a top view of an alternate embodiment of this invention;

FIG. 4 is a top view of another alternate embodiment thereof;

FIG. 5 is a top vie of another alternate embodiment thereof;

FIG. 6 is a top view of another alternate embodiment thereof;

FIG. 7 is a top view of another alternate embodiment thereof;

FIG. 8 is a semidiagrammatic view of still another alternate embodiment thereof;

DESCRIPTION OF THE PREFERRED EMBODIMENTS

Figure 9:
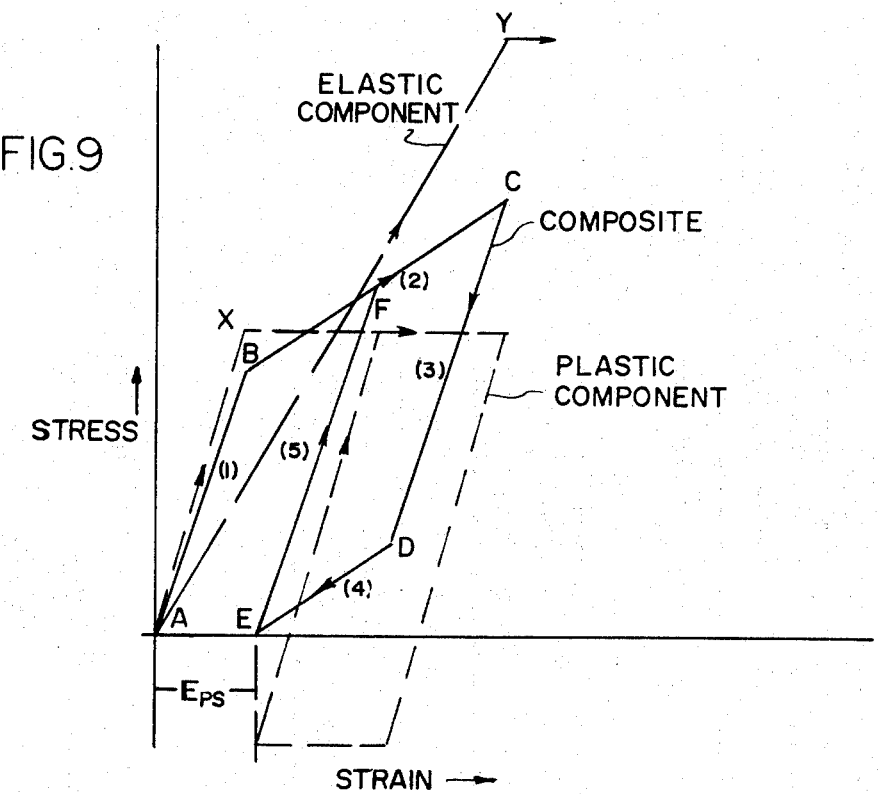
FIG. 9 is a graph of the idealized stress-strain behavior of the preferred embodiment of this invention.

With reference nw to the drawings and more particularly FIGS. 1–7, a preferred embodiment of a spring-energy dissipator shape is designated generally at 10 formed of an elongated solid, cylindrical rod 11 which is two-component metallic composite. The rod 11 is helically twisted and set in the helical shape 10 by conventional helical spring forming apparatus.

The term "composite" as used herein refer to at least two dissimilar materials, one material embedded in matrix of the other and with a bond between the interfaces of the materials which gives the composite equal strain, i.e., the bond prevents movement of one material with respect to the other when a strain is applied. For convenience one material will be referred to as the primary material and one as the secondary material.

The terms composite, energy controlling device, composite, or shape, and spring - energy dissipating shape will all be referring to the energy controlling device of the present invention.

In the preferred embodiment, a primary material formed of continuous elongated structures 12 such as fibers, rods, tubes, element, filaments or multifilament strands are continuous along the length of rod 11, preferably parallel to each other and coaxial with the longitudinal axis of rod 11, and are embedded in a secondary material 13, the structure 17 acting as a reinforcement material in rod 11.

The rod 11 is preferably formed by known composite fabrication procedures which include mechanical swaging, vacuum deposition of the matrix about the reinforcing elongated structures, chemical treatments, directional solidification, roll bonding, extrusion, wire drawing and the like. Two preferred methods of forming the rod 11 are described in U.S. Pat. Nos. 3,378,999 and 3,379,000 where metal drawing techniques are used to form composites with the matrix metal removed after fabrication. These same techniques can be used in the present invention to form the composites without removal of the matrix material.

The distribution of the elongated structures 12 in rod 11 can vary greatly, although in the preferred embodiment the elongated structures 12 are uniformly distributed throughout the cross sections area of rod 11 as best illustrated in FIG. 2. In some cases, it may be desirable to concentrate the structures 12 at the outer periphery since shear stress may be greatest at the outer periphery of the rod 11.

The specific materials of the two-component composite of rod 11 can be varied depending upon the value desired for the energy storage and energy damping characteristics of the shape formed. Accordingly, it is possible then to maximize the energy storage or spacing characteristics within a specified load range and minimize energy damping within a higher load range, or minimize energy storage in a lower load range and maximize energy damping within a higher load range, along with any variation desired between these two extreme designs. In all cases where a one-piece spring-energy dissipator shape is formed, it is preferred that the materials be selected so that the composite exhibits stress-strain hysteresis loop when subjected to load at predetermined levels at or below the secondary material elastic yield limit of the composite but above the primary material elastic yield limit of the composite.

FIG. 9 shows a schematically idealized stress-strain behavior of the energy controlling device. The stress-strain curves for the primary and secondary material components are indicated in dotted lines (the primary material noted as the plastic component and the secondary material noted as the elastic component). The resulting stress-train behavior of the energy controlling device is illustrated by the heavy black line denoted composite. The composite curve shown indicates that there are three important parameters in the design of the spring-dissipator shape of the present invention.

The first parameter is the yield strain of each individual component, denoted by elastic yield limit X of the primary material and elastic yield limit Y of the secondary material, which in turn determine the yield limits B and C of the composite curve, respectively. Second is the elastic modulus of the individual components represented by the slope of the line A–X of the plastic component and the slope of line A–Y of the elastic component, the combination of which determines the slope of lines A–B, E–F, and D–C of the composite curve. The latter lines A–B, E–F, and D–C being substantially parallel to each other. The slope is defined as the ratio of the amount of stress to strain as represented by the line segments in each curve. Generally, the slope of line segments A–B, E–F, and D–C is greater than the slope of line segments B–C and E–D (which are also substantially parallel to each other). This indicates that the elastic modulus of the composite changes from part 1 of the curve to part 2 and similarly for parts 3, 4, and 5 of the composite curve.

A third parameter is the prestrain, indicated by Eps. The permanent prestrain of the composite is defined by the ratio of the volume fraction of the plastic component (primary material) multiplied by its modulus (represented by the slope of line A – X) to the volume fraction of the elastic component (secondary material) multiplied by its modulus (represented by the slope of line A – Y), this ratio multiplied by the yield strain of the plastic component of the composite. The volume fraction is defined as the ratio of the total cross sectional area of one component to the total cross sectional area of the composite, Since the prestrain is related to the ratio of the volume fraction of the component materials of the composite, it define the lower strain limit, point E, in FIG. 9 of a closed hysteresis loop to be described later. Knowing what Eps will be is important when designing the composite for a particular intended use. The maximum prestrain developes once there is a compressive residual yield stress present in the yielded component and plastic damping can occur characterized by a closed hysteresis loop to be described.

Referring to FIG. 9 again, during initial loading 1, the composite behaves elastically with a primary elastic yield limit between that of the two individual components, shown as line A–B. The next part of the curve 2 represents the region beyond the elastic yield limit X of the primary material but at or below the elastic yield limit Y of the secondary material, shown as line B–C. Thus, a reduced effective elastic modulus of the composite is obtained because only the secondary material contributes toward the elastic response in this region, with the primary material undergoing plastic deformation. During unloading 3, both components are again elastic until all the elastic tensile strain is removed from the composite and until some compressive stress is induced in the primary plastic component, shown by line C – D. Beyond a certain point D, the matrix undergoes plastic deformation in the reverse direction 4 and the effective elastic modulus of the composite is again decreased, with the primary material again undergoing plastic deformation, shown as line D - E. After the load is removed, a permanent prestrain remains in the material as graphically illustrated by Eps on the strain scale. Upon reloading response of the spring composite occurs along lines 5, 2, 3, and 4, which is now the hysteresis loop for this spring. The area under curves 5 and 2 represent the energy stored by the composite before unloading. The difference on unloading to E is the area inside the hysteresis loop 5–2–3–4 represents the energy dissipated, which produces a damping action. The energy associated with the plastic deformation of the primary material is substantially converted to heat by transition of energy. The initial permanent deformation is preferably put into the composite during manufacture as during manufacture of a spring, for example and thereafter the composite behaves as a spring and energy dissipator where it absorb energy during each cycle. The energy absorbed is not dependent primarily upon the speed of loading and approximates Coloumb-type damping where the materials of the composite are not strain rate dependent, i.e., it is not dependent upon the speed of application of the load.

The above is an idealized consideration; however, in the helical spring shape of the specific example, conditions differ somewhat from the case of pure tension shown in FIG. 9. The mode of loading a helical extension or compression spring is primarily torsional shear. Therefore, the shear modulus and shear yield strength are the parameters that control the stress-strain behavior of the system. Furthermore, the shear strain of a bar stressed in torsion is greater at the surface of the bar and decreases uniformly to zero at the central axis of the bar. As shear strain is increased, a continually increasing proportion of the primary material exceeds its elastic yield limit, and this causes a gradual transition from elastic behavior to plastic behavior of the primary material and a resultant rounding off of the line segments as shown on the actual hysteresis curve or loop in FIG. 10.

Figure 10:
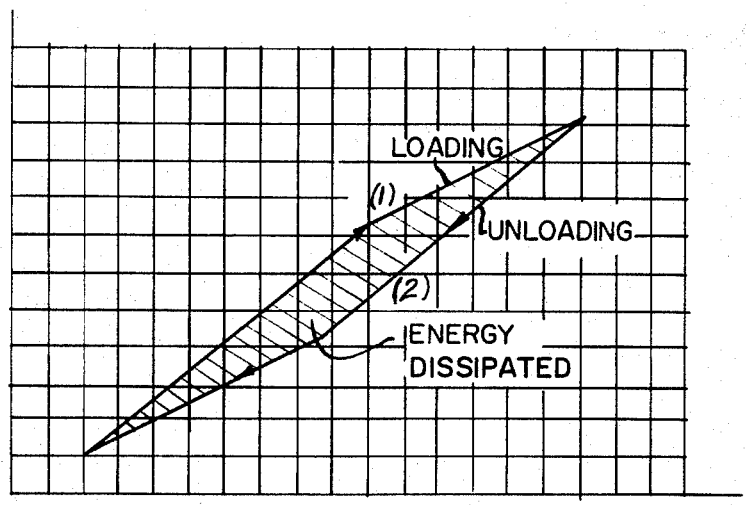
FIG. 10 is a load extension curve for repeated cycles after the fourth loading cycle of the present invention.

The actual load extension curves for the spring shape 23 of the specific example is shown in FIG. 10. In FIG. 10 the loading 1 and unloading 2 cycles are shown. There is some slight additional permanent set caused by the second loading cycle, however, after approximately four load cycles a completely closed hysteresis loop results. It should be noted that the energy absorbed and damped in the hysteresis loop 1, 2 shown in FIG. 10 represents the mechanical energy expended during the extension and relaxation of the spring.

In a specific example of a spring-energy dissipator shape, a helical extension spring shape 10 is formed from a rod 23 indicated in FIG. 5 (according to the methods set out in the patents referred to). The spring shape 10 is set with 6 coils with the rod 22 being a stainless steel 304 having an outer diameter of 0.02875 inch and an inner diameter of 0.0259 inch; the annulus 21 being copper with an inner diameter of 0.0122 inch; and the rod 22a being stainless steel 302. The volume fraction of the copper to the total composite is 0.63. The spring shape 10 is set with a coil diameter of 0.244 inch in a conventional spring forming machine. The spring (see FIG. 2) was then subjected to a toal deflection amplitude of 0.195 inch with a resulting energy dissipation of 16.2 percent of the input energy. It must also be noted that the above described spring was tested in a conventional transmissibility tester, the transmissibility of the composite as found to be substantially reduced as compared to a similar spring made from conventional materials. (Transmissibility of the composite will be defined later.)

In another example, either a tension rod or compression pad shape can be formed from a rod 11, as shown in FIG. 1, having an outer diameter of 0.128 inch, and having 80,899 continuous 304 type stainless steel filaments 12 (of 0.3 mils diameter) in a Monel matrix 13. The volume fraction of the filament 12 to the composite volume was 0.47. One end was fixed and the other end subjected to varying loads between 100 and 700 pounds. The resulting energy dissipation was approximately 23 percent of the input energy.

Another example of a tension rod or compression pad shape, formed from a rod 11, as shown in FIG. 1, had an outer diameter of 0.253 inch, and having seven continuous 304 type stainless steel filaments 12 (of 0.067 inch diameter) IN A Monel matrix 13. The volume fraction of the filaments 12 to the composite volume was 0.50. One end was fixed and the other end subjected to varying loads between 400 and 3800 pounds. The resulting energy dissipation was approximately 20 percent of the input energy.

FIG. 10 is a representation of a hysteresis loop, indicating the amount of energy dissipated, that was typical of the hysteresis loop found in the above three examples. It must be noted that it is the hysteresis loop after four cycles of loading and unloading the spring-shape 10, four cycles being the number of cycles that tends to indicate a stabilization of the hysteresis loop, although more or less cycling may be found necessary depending on the primary and secondary materials used.

The above description relates to a shape of this invention which acts as a spring and energy dissipator since it provides both energy storage and energy dissipation above the primary elastic yield limit and in the secondary modulus region indicated by line 2 in FIG. 9. However, the energy controlling device 10 can also act as a spring to merely store energy when the loads applied are below the primary elastic yield limit as along line 1 of FIG. 9. Moreover, it should be understood that the shapes such as shape 10 can have the materials of the composite so selected to maximize mechanical energy storage, i.e., spring action or to maximize the combined energy storage and energy dissipating action depending upon particular spring and shock absorbing properties desired.

Condition equations can be developed from application of well known strength of materials principles for determining proper selection and optimization of materials and parameters of the composites useful in this invention. These specific equations can be determined for loading only in the primary elastic modulus region, or where loading extends into the secondary modulus region where the primary material having the lower elastic yield strain has passed its elastic strain limit and is undergoing plastic deformation. The secondary material still acting within its elastic strain region returns the primary material to its elastic strain region during every cycle.

The specific shapes of composites used either as springs or as spring-energy dissipators can vary greatly. For example, while right cylindrical shapes have been shown for the rods 11 and the elongated reinforcement 12, either or both can have widely varying cross sectional configurations such as irregular, square, rectangular, and the like configurations. Similarly, while helical spring shape are shown in the preferred embodiment, the shapes of this invention can vary greatly so long as the composite used exhibits energy storage and/or energy damping characteristics for a particular application. Thus, any of the known spring configurations including helical, torsion bar, flat, leaf and like configurations can be used. It must be noted here, however, that in cases of torsional applications of the energy controlling device, the factors of geometry of the overall composite and the arrangement and shape of the primary and secondary materials with respect to each other are very important to achieving optimum energy storage and energy dissipating properties. Similarly, in certain applications, the composite itself need not be shaped as into a helix as shown in FIG. 2 but can be used in its bar or rod form directly much as solid blocks of hard rubber are used as dampers in conventional applications.

FIGS. 3–8 illustrate various forms of the shapes of this invention. In FIG. 3, a conventional jelly roll spring shape is used which can comprise laminated bonded sheets of alternate primary 12 and secondary 13 materials selected in accordance with this invention.

It should also be noted at this point that more than two dissimilar materials can be used as shown in FIG. 3. The use of more than two dissimilar materials, as previously discussed, provides even greater flexibility in determining what spring or spring-energy dissipating characteristics of the composite will be exhibited in specified load ranges. It is possible therefore to use three materials, two of them having strain modulus characteristics as stated before, and the third having an elastic yield stain greater than the secondary material as previously described. With this composite, it is then possible to take the secondary material past its elastic yield strain and thereby force both the primary and secondary materials to undergo plastic deformation. In this way more precise control over the spring and spring-energy dissipating characteristics can be obtained within specified load ranges.

In FIG. 5, different metals 21, 22 and 22a are used as concentric bonded tubes in an elongated rod spring 23. FIG. 6 illustrates the primary material or filaments 12 in a secondary material 13 as previously described where the filaments 12 are cladded with a third material 12a. FIG. 4 illustrates a rod such as 11 formed into a spiral configuration 23.

FIG. 8 illustrates a rod such as disclosed at 11 with the difference being that the primary material filaments 12 are helically twisted and embedded within the secondary material 13. The helical twisting and mechanical setting of the filaments 12 within the secondary material 13 can be used to add strength in one direction to shapes of this invention particularly when used as springs for energy storage. The rod of FIG. 8 can be bent into various spring shapes as already discussed. The filaments 12 can be twisted at any angle to the longitudinal axis of the composite, the angle optimizing the spring and/or spring-energy dissipating properties depending on the of the filaments 12 within the composite.

FIG. 7 illustrates a rod such as 11 where the filaments 12 are contained within the secondary material 13 in the form of a tube having a hollow center 26. This element 11a can be wound into a helix or other spring-type shapes as already discussed with high efficiency since torsional shear stresses in helical springs are mainly concentrated at the periphery of the rods used. The advantage obtained by the use of a hollow rod as in the embodiment of FIG. 7 include placing the filaments 12 at positions along the periphery where torsional sheer stress is greatest. A similar advantage can be obtained in solid composite rods by using a graded density of the filaments 12 in the rod 11. Thus, more of the filaments 12 can be concentrated at the periphery with fewer of the filaments along the axis if desired.

Figure 12:
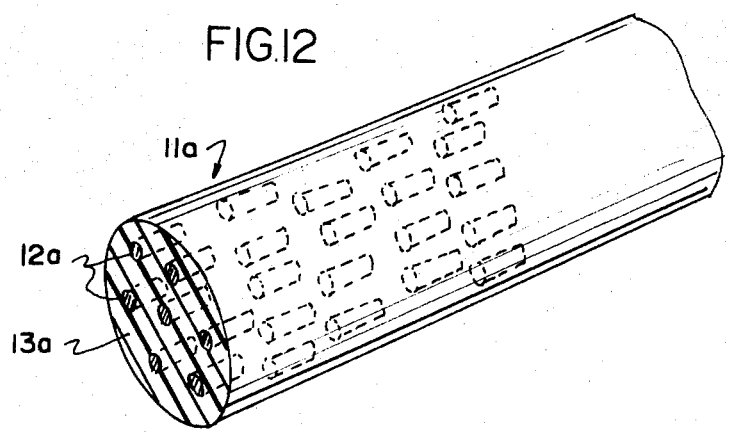
FIG. 12 is a perspective view of still another embodiment of the present invention.

FIG. 12 illustrates a rod 11a similar to rod 11, where the filaments 12a are discrete elongated structures, fibers, or elements embedded in a matrix material 13a. As before, the filaments 12a can be made of the primary or secondary material, with the matrix 13a the secondary or primary material, respectively.

Figure 11:
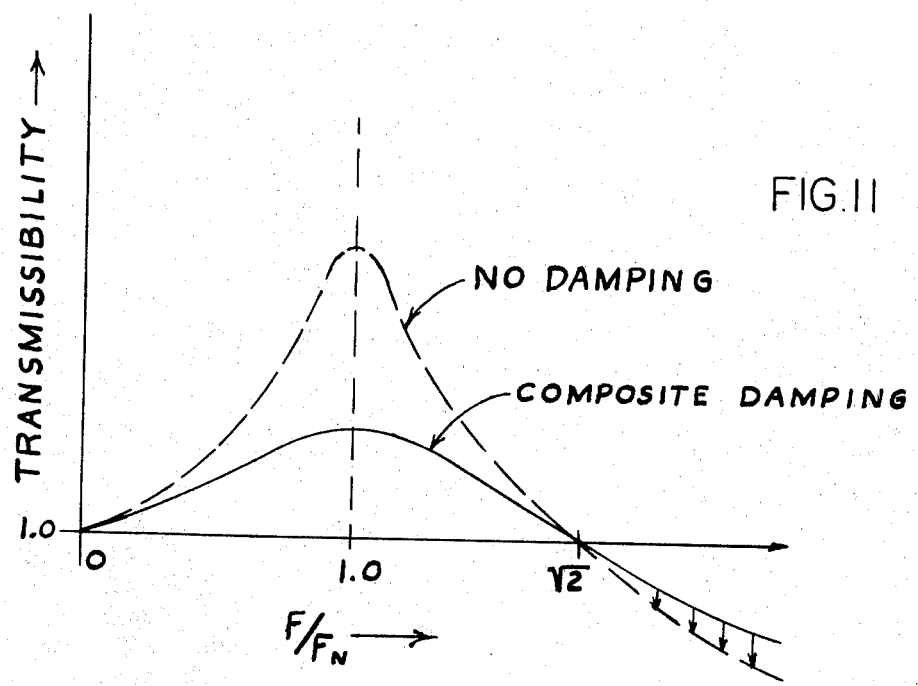
FIG. 11 is a transmissibility curve for a vibration isolator spring made of the composite device of the present invention.

FIG. 11 illustrates a general transmissibility curve for the energy controlling device when used as a vibration isolator. It indicates the effectiveness of vibration isolators which isolate masses from vibration in a support to which the mass is attached or suspended. The transmissibility is defined as the ratio of the amplitude of the vibration isolator-mass system to the amplitude of the vibration of the support. The abscissa is the ratio of the input frequency, $f$, of the support to the natural frequency, $fn$, of the vibration isolator-mass system. If the vibration isolator is made in the form of a helical spring, then the dotted curve shows the response of a conventional spring-mass with no damping properties, while the solid curve indicates the response of a spring-mass with the spring made with the composite of the present invention. The graph clearly depicts the energy dissipating and damping that occurs with the composite of the present invention, and indicates that transmissibility will for the composite spring will always be much less than the transmissibility for conventional springs, in the range where $f/fn$ is greater than zero but less than or equal to the square root of two. In the range where $f/fn$ is greater than the square root of two, the transmissibility of the composite spring will be greater than that of the undamped conventional spring-mass (indicated by the dotted curve), and depending on design can be made to respond substantially like an undamped conventional spring-mass system. Accordingly, in this range, the composite spring response curve will then approach the no damping curve as indicated by the arrows on FIG. 11.

While we have shown and described specific embodiments of the present invention, it will, of course, be understood that other modifications and alternate constructions may be used without departing from the true spirit and scope of this invention. We therefore intend by the appended claims to cover all such modifications and alternative constructions as fall within their true spirit and scope.

What we intend to claim and secure by Letters Patent of the United States is:

1. An energy controlling composite formed of at least two dissimilar materials comprising; a primary material and a secondary material, with said secondary material having an elastic yield strain limit at least twice that of the lowest measurable elastic yield strain limit of the primary material, said materials being bonded together therebetween at interfaces thereof, and said energy controlling composite capable of exhibiting an energy storage property at strain levels at or below the primary material elastic yield limit, and said energy controlling composite exhibiting energy storage and energy dissipating properties in the form of a stress-strain hysteresis loop at strain levels at or below the secondary material elastic yield limit but above the primary material elastic yield limit.

2. An energy controlling composite in accordance with claim 1 wherein said bond is such that it prevents movement of either material relative to the other when a load is applied to said composite.

3. An energy controlling composite as recited in claim 1 wherein the primary material comprises a plurality of elongated structures embedded in the secondary material separating said primary structures.

4. An energy controlling composite as recited in claim 1 wherein the dissimilar materials are made of metal.

5. An energy controlling composite as recited in claim 1 wherein the secondary material comprises a plurality of elongated structures embedded in the primary material separating said secondary structures.

6. An energy controlling composite as recited in claim 1 wherein the composite is in the form of a spring.

7. An energy controlling composite in accordance with claim 6 wherein said spring shaped composite is in the form of a helix.

8. An energy controlling composite as recited in claim 1 wherein the primary material comprises a plurality of discrete elongated structures embedded in the secondary material separating said discrete elongated structures.

9. An energy controlling composite as recited in claim 1 wherein the secondary material comprises a plurality of discrete elongated structures embedded in the primary material separating said secondary discrete elongated structures.

10. An energy controlling composite as recited in claim 1 wherein the primary material is in the form of an annulus embedded in the secondary material.

11. An energy controlling composite as recited in claim 1 wherein the primary material and the secondary material are laminated together.

12. An energy controlling composite as recited in claim 1 wherein the bond between said primary and said secondary materials is a mechanical and/or metallurgical interfacial bond therebetween.

13. An energy controlling composite as recited in claim 1 wherein said composite exhibits energy storage and energy dissipating properties above 500° F.

14. An energy controlling composite as recited in claim 1 wherein the tensile strength of the composite is independent of the size of the composite.

15. An energy controlling composite as recited in claim 1 wherein the energy dissipating property is independent of the rate of input of energy and capable of operating over a continuous range of energy inputs.

16. A method of obtaining energy storage and damping between two positions, one position movable with respect to the other, said method comprising providing an energy controlling composite formed of at least two dissimilar materials comprising; a primary material and a secondary material, with said secondary material having an elastic yield strain limit at least twice that of the lowest measurable elastic yield strain limit of the primary material, said materials being bonded together therebetween at interfaces thereof, and said energy controlling composite capable of exhibiting only an energy storing property at strain levels at or below the primary material elastic yield limit, and said energy controlling composite exhibiting only energy storage and energy absorbing properties in the form of a stress-strain hysteresis loop at strain levels at or below the secondary material elastic yield limit but above the primary material elastic yield limit, positioning said composite between said two positions, and moving at least one of said positions with respect to the other whereby energy storage and energy damping is obtained.

17. A method of obtaining energy storage between two positions one position movable with respect to the other, said method comprising providing an energy storage composite formed of at least two dissimilar materials comprising; a primary material and a secondary material, with said secondary material having an elastic yield strain at least twice that of the lowest measurable elastic yield strain of the primary material, said materials being bonded together therebetween at interfaces thereof, and said energy controlling composite exhibiting an energy storing property at strain levels at or below the primary material elastic yield strain, positioning said shape between said two positions, and moving at least one of said positions with respect to the other such that strain levels at or below the primary material elastic yield strain are developed in the composite whereby said composite acts to store energy.

18. An energy controlling composite comprising:

a first material structure and a second material structure, the second material structure having an elastic yield strain limit at least twice that of the elastic yield strain limit of the first material structure, the first material structure interfacially bonded to the second material structure, characterized in that the composite exhibits energy storing and energy dissipating properties at a strain level above the elastic yield strain limit of the first material but at or below the elastic yield strain limit of the second material, and characterized in that the composite exhibits energy storing properties at a strain level at or below the elastic yield strain limit of the first material.

19. An energy controlling composite as recited in claim 18, wherein the energy controlling composite exhibits energy storage and energy dissipating properties in the form of a stress-strain hysteresis loop at strain levels at or below the second material elastic yield limit but above the first material elastic yield limit.

20. An energy controlling device comprising:

a continuous first material structure;

a continuous second material structure, the second material structure having an elastic yield strain limit at least twice that of the elastic yield strain limit of the first material, the first and second material structures inter-facially bonded together; and means for energy storing and energy dissipating at a strain level above the elastic yield strain limit of the first material but at or below the elastic strain limit of the second material.

* * * * *